Patented Mar. 17, 1931

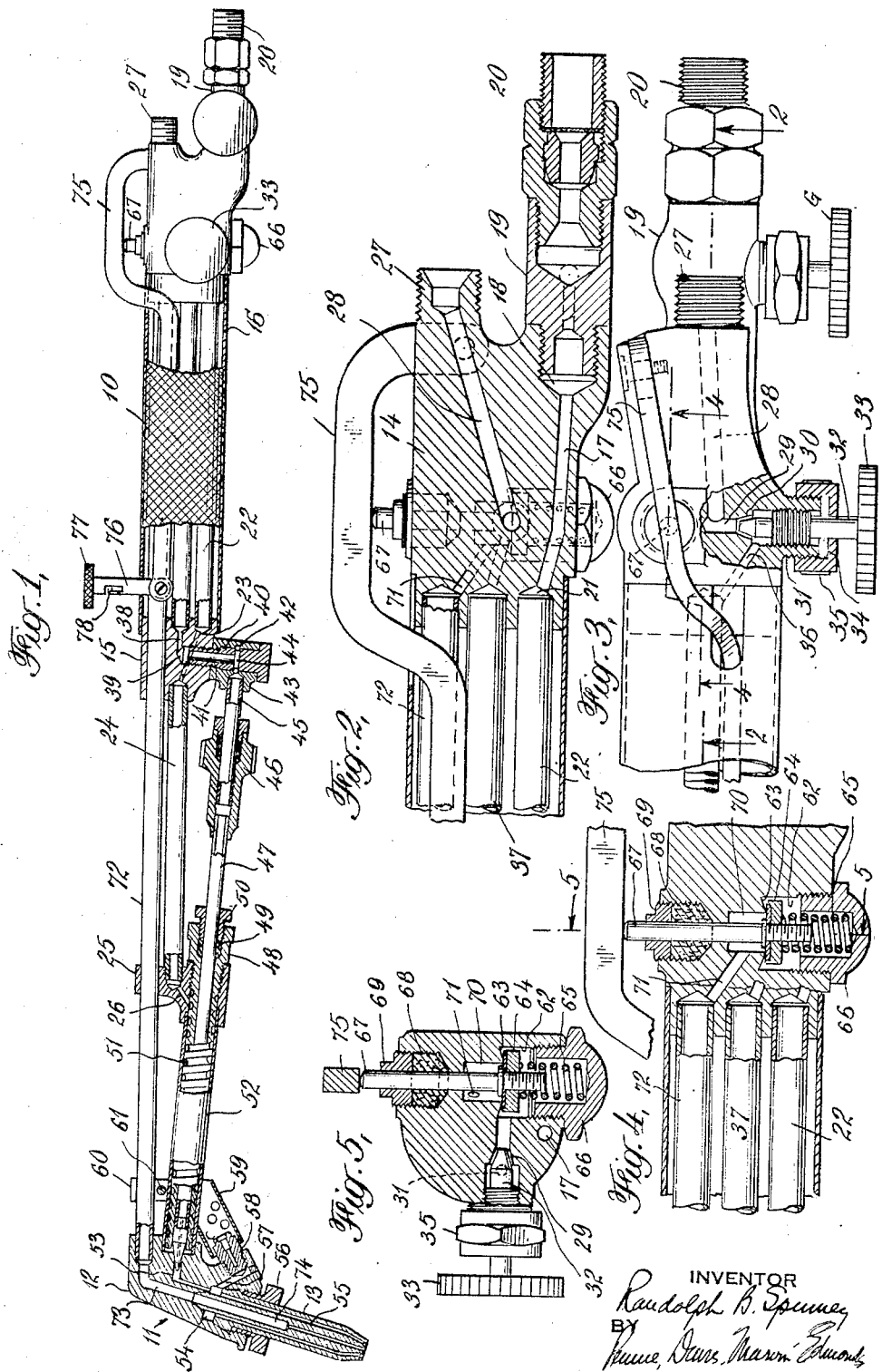

1,796,768

UNITED STATES PATENT OFFICE

RANDOLPH B. SPINNEY, OF HOLLIS, NEW YORK, ASSIGNOR TO LIQUID FUEL CUTTING & WELDING TORCH CORP., OF NEW YORK, N. Y., A CORPORATION OF NEW YORK

LIQUID-FUEL-BURNING TORCH

Application filed June 7, 1930. Serial No. 459,714.

This invention relates to torches of the type in which a combustible mixture of fuel and oxygen is burned with the generation of high temperature. More specifically, the present invention is concerned with a torch in which liquid fuel, such as gasoline, is employed as the combustible, the liquid being vaporized in the torch and mixed with oxygen to produce a mixture which is burned at a tip. The new torch finds its greatest utility in the cutting of metals by means of a jet of pure oxygen, the flame resulting from the burning of the combustible being used in the ordinary manner to raise the temperature of the metal to the point at which the oxygen may act upon it. For purposes of illustration of an embodiment of the invention, the new torch will be described in a form suitable for cutting purposes, though it is to be understood that the principles of the invention may be incorporated in torches for heating purposes only.

The torch herein illustrated and described is in many respects similar to those set forth and described in the applications of Wilson and Petty, Serial Nos. 352,691 filed April 5, 1929, which has resulted in Patent No. 1,773,418, issued August 19, 1930 and 409,481 filed November 25, 1929, but includes numerous improvements thereon, by virtue of which the torch is lighter in weight, the cost of manufacture is reduced, and the use of the torch is made more convenient and less tiring on the operator.

For a better understanding of the invention, reference may be had to the accompanying drawings, in which Fig. 1 is a view of the improved torch in side elevation with parts shown in section;

Fig. 2 is a sectional view on the line 2—2 of Fig. 3;

Figure 3 is an enlarged view of a portion of the torch in side elevation with parts shown in section;

Fig. 4 is a sectional view on the line 4—4 of Fig. 3; and

Fig. 5 is a sectional view on the line 5—5 of Fig. 4.

Referring now to the drawings, the torch comprises a handle generally designated 10 and a head 11, this head including a block 12 in which is mounted a flame tip 13. The handle comprises a rear block 14, a front block 15, and a tubular casing 16 extending between the blocks and preferably having a knurled surface to provide a firm handhold.

Extending through the block 14 is a passage 17 for the liquid fuel and this passage has an enlarged opening 18 at its rear end in which is threaded a valve 19 for controlling the fuel supply. The fuel is led to the valve through a pipe, not shown, which is threaded on a nipple 20. At the other end, the passage 17 terminates in an enlarged opening 21 which receives the end of a pipe 22 which extends from the block 14 and is seated at its forward end in the block 15 in a recess communicating with a passage 23. This passage leads through the block to another recess in which is seated a pipe 24 which is threaded in a recess in a block 25 and communicates with a passage 26 through the block.

At the rear end of the block 14 is a threaded hollow extension 27, the interior of which communicates with a passage 28 which leads to another passage 29 provided with a valve seat 30. Aligned with the passage 29 is a threaded extension 31 from the block 14 in which is threaded a valve stem 32, the stem having a frusto-conical end cooperating with the seat 30. The stem is provided with a handle 33 and it is packed by means of packing 34 and nut 35. Beyond the valve seat, a passage 36 leads through the block to a recess in which is seated the end of a pipe 37 seated at its other end in a recess in the block 15 and in communication with a passage 38 through that block. The passage 38 leads to a recess 39 into which is threaded a bolt 40 having a passage 41 therethrough. This bolt is also threaded through a T 43 and has a circumferential channel 42 and transverse bores 44. The passage 41 communicates through the bores with the channel, which is in communication with a pipe 45 having one end received in the T 43.

Oxygen is supplied through a suitable connection to the passage 28 in the block 14 and passes under the control of the valve 32 to the pipe 37, whence it flows through the passage 38 and through the bolt 40 to the pipe 45. Mounted on the pipe 45 is an adjusting nut 46 in the end of which is threaded a pipe 47. By rotation of the nut 46, the pipe 47 can be moved endwise toward and away from the pipe 45.

Threaded in an opening in the block 25 and extending therethrough is a tube 48 through which the pipe 47 extends, the pipe being packed with packing 49 held in place by a nut 50. The tube 48 is provided with a circumferential groove 51 formed in its outer surface and is enclosed within a tube 52 which enters a chamber in the head 12 and extends to the block 25. The tube 52 fits the outer surface of tube 48 closely so as to close the groove 51 and thus provide a helical passage between tube 48 and pipe 52. The passage 26 in block 25 communicates with one of the convolutions of the helical passage so that liquid fuel which flows through the pipe 22, passage 23 and pipe 24 to passage 26 proceeds through the helical passage 51 through the end of the tube 48.

The tube 48 terminates a short distance from the end of the pipe 52 which is seated in the chamber in the head 12, and communicating with this chamber is a passage 53 in the head which leads to a circumferential channel 54 in a frusto-conical recess in the end of the head in which is seated the tip 13. This tip is provided with a plurality of lengthwise passages 55 communicating with the channel 54 so that the fuel leaving the helical passage 51 and entering the passage 53 is supplied through channel 54 to all of the passages 55 in the tip. The tip is held in place in the head by means of a nut 56 threaded into the head and bearing against a portion of the tip.

The pipe 47 has a conical end which forms a valve cooperating with a conical surface in the head at the end of passage 53 to control the flow of fuel from the passage 51 to the passage 53. The flow is regulated by moving the pipe 47 endwise by means of the adjusting nut 46.

Communicating with the channel 54 in the head is a passage 57 leading to a recess in which is threaded a preheater tip 58. This preheater tip has a passage through it which receives a combustible mixture from the passage 57 and a shield 59 surrounds the end of the tip 58 to protect the flame. This shield is made of a metal blank having a strap portion 60 which is bent upon itself to enclose the tube 52, the two ends of the strap being enlarged to form a cylindrical enclosure for the preheater flame. The shield is held in proper position by means of a bolt 61.

The passage 28 in block 14 has a branch leading to a chamber 62, one wall of which is formed with a frusto-conical valve seat 63 against which is held a valve 64 by means of a spring 65 seated at one end in a plug 66 threaded into the end of the chamber 62. The valve 64 has a stem 67 which passes through an opening in the block and projects outwardly therebeyond, the stem being packed with packing 68 held in place by a nut 69. Beyond the valve 64 is a chamber 70 from which a passage 71 leads to a recess in the block in which is seated the end of a pipe 72. This pipe extends through the blocks 15 and 25 and is seated at its other end in a recess in the head 12. A passage 73 in the head leads from the end of the pipe to a central bore 74 through the tip 13.

Pivotally mounted on the block 14 is an operating lever 75, one portion of which bears against the end of the valve stem 67, and the lever is bent so that its free end enters an opening in the casing 16 and lies within the handle 10. Attached to the free end of the lever 75 is a dog 76 provided with a thumb piece 77. The dog 76 passes through an opening in the casing 16 and it is provided with a recess 78 which can be engaged with the casing at the opening upon depression of the dog. When the dog is thus depressed, the lever 75 forces the valve 64 from its seat and the lever can be held in position with the valve open by engagement of the dog with the wall of the casing 16.

In the operation of the torch, the liquid fuel is supplied through the valve 19 and passes through block 14 to the tube 22, whence it flows to the tube 24 and eventually reaches the helical passage 51 in the tube 48. Oxygen for combustion flows through the passage 28 and past the valve 32 in regulated amounts to the pipe 37 whence it flows through block 15 to pipe 45 and thence through pipe 47 to the head. In the passage 53, oxygen for combustion and vaporized fuel are mingled and supplied to the channel 54, from which the combustible mixture is supplied to the bores 55 in the tip. A part of the combustible mixture passes to the preheater tip and is ignited.

The preheater flame strikes the outer surface of the tube 52 and heat is thus transmitted through the tube to the liquid fuel flowing through the helical passage 51. Since the fuel as it reaches the preheater flame is confined in a passage defined wholly by metal, heat is transmitted to the fuel rapidly and in such manner as to cause complete vaporization. The helical passage has a plurality of convolutions within the zone of temperature developed by the preheater flame which also insures an effective vaporizing action. The amount of fuel that is mingled with the oxygen to produce the combustible mixture is controlled by the valve on the end of the tube 47 and by endwise movement of this tube, a greater or less amount of the fuel vapor will be supplied to the head.

The oxygen for combustion is supplied in amounts determined by the setting of the valve 32. The oxygen for cutting is controlled by the spring-pressed valve 64 and ordinarily for cutting purposes, the oxygen will be used at full pressure. When the operator desires to cut the lever 75 is depressed by the thumb piece 77 on the dog 76 and held locked in that position.

It will be observed that the valve 32 is disposed in such manner that it can be readily removed for cleaning, and when the valve is threaded out of the block 14, the valve seat is fully accessible. Similarly, the valve 64 is mounted in the block 14 at an angle to the axis of the handle and above the side of the casing 16 so that by removal of the plug 65, the valve can be removed and worn parts of the valve may be readily replaced and the valve seat quickly cleaned. The T bolt 40 may also be removed without difficulty to clean the passages thereof. By removal of this bolt, the pipes 45 and 47 may be withdrawn and the tube 48 may be slipped out of the tube 52 to clean the helical channel.

From the foregoing, it will be evident that the parts of the torch are readily demountable and can be quickly assembled and the torch can be kept in proper working condition without difficulty. The torch is of light weight and the block 14 and the valves mounted therein at one end of the handle partly counterbalance the head and the parts associated therewith at the other end of the torch. The torch is thus easily handled and by reason of its balance and light weight is not tiring to the operator.

What I claim:

1. In a torch, a head having a chamber opening through one wall thereof and a passage leading therefrom, a valve seat in the chamber, a tube having an end entering the chamber, a second tube within the first and having a channel in its outer surface, the channel being closed by said first tube to form a passage leading to the chamber at one side of the valve seat, and a third tube within the second and carrying a valve cooperating with the seat to control communication through the chamber between the passage in the head and the passage defined by the first and second tubes, said third tube communicating with the passage in said head.

2. In a torch, a head having a chamber opening through one wall thereof and a passage leading therefrom, a valve seat in the chamber, a tube having an end entering the chamber, a second tube within the first and having a channel in its outer surface, the channel being closed by said first tube to form a passage leading to the chamber at one side of the valve seat, and a third tube within the second having its end shaped to form a valve cooperating with the seat to control communication between the passage in the head and the passage defined by the first and second tubes, said end of the tube extending through the chamber and communicating with the passage in the head.

3. In a torch, a head having a chamber opening through one wall thereof and a passage leading therefrom, a valve seat in the chamber, a tube having an end entering the chamber, a second tube within the first and having a channel in its outer surface, the channel being closed by said first tube to form a passage leading to the chamber at one side of the valve seat, a third tube within the second having its end shaped to form a valve cooperating with the seat to control communication between the passage in the head and the passage defined by the first and second tubes, said end of the tube projecting beyond the valve seat and into the passage in the head, and means for moving the third tube endwise to open and close the valve.

4. In a torch, a head having a chamber opening through one wall thereof and a passage leading therefrom, a valve seat in the chamber, a tube having an end entering the chamber, a block in which the other end of the tube is mounted, a second tube within the first and threaded into the block, the second tube having a channel in its outer surface closed by the first tube to provide a passage leading to the chamber at one side of the valve seat, and a third tube within the second carrying a valve cooperating with the seat to control communication through the chamber between the passage in the head and the passage defined by the first and second tubes, the third tube extending through the chamber and entering the passage in the head.

5. In a torch, a head having a chamber opening through one wall thereof and a passage leading therefrom, a valve seat in the chamber, a tube having an end entering the chamber, a second tube within the first and having a channel in its outer surface, the channel being closed by said first tube to form a passage leading to the chamber at one side of the valve seat, a third tube within the second carrying a valve cooperating with the seat to control flow through the chamber, a fixed pipe aligned with the third tube, and an adjusting member on the pipe and connected to the third tube.

6. In a torch, a head having a chamber opening through one wall thereof and a passage leading therefrom, a valve seat in the chamber, a tube having an end entering the chamber, a second tube within the first and having a channel in its outer surface, the channel being closed by said first tube to form a passage leading to the chamber at one side of the valve seat, a third tube within the second carrying a valve cooperating with the seat to control flow through the chamber, a pipe aligned with the third tube and mounted in fixed position at a distance therefrom, and an adjusting nut threaded on the adjacent spaced ends of the third tube and pipe and adapted to move the third tube endwise by rotation of said nut.

7. In a torch, the combination of a head having a passage opening into a chamber, a valve seat in said chamber surrounding the passage opening, a tube carrying a valve cooperating with the seat, a second tube aligned with the first and at a distance therefrom, a block having a passage, a T attached to the block having a passage communicating with the passage in said block, the end of said second tube being secured to said T in communication with the passage therein, and means connecting the adjacent ends of said tubes and operable to vary their relative positions.

8. In a torch, the combination of a block having a passage leading to a recess, a T having a passage, a hollow bolt passing through the T to secure it to the block, the interior of the bolt being in communication with the passages in the block and T, and a pipe mounted in the T in communication with the passage therein.

9. In a torch, the combination of a block having a passage leading to a recess, a T having a passage, a hollow bolt threaded through the T and into the block, the interior of the bolt being in communication with the passages in the block, and T, and a pipe mounted in the T in communication with the passage therein.

10. In a torch, a head having a passage for a combustible mixture, a preheater tip mounted on said head and receiving combustible mixture from said passage, and a shield surrounding the flame issuing from said tip, said shield comprising a metal blank folded upon itself to provide a mounting loop having opposed ends providing a flame enclosure.

11. In a torch a head having passages for a cutting gas and a combustible mixture respectively, a handle, passages from said handle to said head for said cutting gas, fuel and a combustion supporting gas respectively, said passages lying side by side with the passage for said combustion supporting gas on the outside, and means on said passage for combustion supporting gas for adjusting the length of said passage.

In testimony whereof I affix my signature.

RANDOLPH B. SPINNEY.